United States Patent
Zhou (10) Patent No.: US 10,331,938 B2
(45) Date of Patent: *Jun. 25, 2019

(54) METHOD FOR CONTROLLING UNLOCKING AND TERMINAL

(71) Applicant: Guangdong Oppo Mobile Telecommunications Corp., Ltd., Dongguan, Guangdong (CN)

(72) Inventor: Yibao Zhou, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 282 days.

This patent is subject to a terminal disclaimer.

(21) Appl. No.: 15/603,861

(22) Filed: May 24, 2017

(65) Prior Publication Data

US 2017/0344799 A1 Nov. 30, 2017

(30) Foreign Application Priority Data

May 30, 2016 (CN) .......................... 2016 1 0374129

(51) Int. Cl.
*G06K 9/00* (2006.01)
*G06K 9/62* (2006.01)

(52) U.S. Cl.
CPC ..... *G06K 9/00087* (2013.01); *G06K 9/00006* (2013.01); *G06K 9/00013* (2013.01); *G06K 9/00067* (2013.01); *G06K 9/6228* (2013.01)

(58) Field of Classification Search
CPC .......... G06K 9/00087; G06K 9/00013; G06K 9/00067; G06K 9/00006; G06K 9/6228
See application file for complete search history.

(56) References Cited

U.S. PATENT DOCUMENTS 6,330,347 B1 * 12/2001 Vajna ................. G06K 9/00067
365/185.33
2002/0048390 A1 * 4/2002 Ikegami ............... G06K 9/0008
382/124

(Continued)

FOREIGN PATENT DOCUMENTS

CN 1564186 A 1/2005
CN 103019579 A 4/2013

(Continued)

OTHER PUBLICATIONS

Office Action 1 issued in corresponding European application No. 17170801.9 dated Sep. 3, 2018.

(Continued)

*Primary Examiner* — Shaghayegh Azima
(74) *Attorney, Agent, or Firm* — Young Basile Hanlon & MacFarlane, P.C.

(57) ABSTRACT

A method for controlling unlocking includes the following operations. A reference feature point set of a finger of a user is acquired by scanning the finger using a fingerprint recognition sensor. A matching process is performed between the reference feature point set and at least one template feature point of a pre-stored fingerprint template feature point set in descending order of matching priority of the at least one template feature point. The terminal is unlocked based on the number of template feature points successfully matched with the reference feature point set.

18 Claims, 8 Drawing Sheets

(56) References Cited

U.S. PATENT DOCUMENTS

| | | | |
|---|---|---|---|
| 2008/0049987 A1* | 2/2008 | Champagne | G06K 9/00026 382/124 |
| 2014/0002240 A1* | 1/2014 | Marciniak | G06K 9/00885 340/5.83 |
| 2015/0286855 A1* | 10/2015 | Neskovic | G06K 9/00073 382/125 |
| 2016/0063230 A1* | 3/2016 | Alten | G06F 21/32 726/28 |
| 2016/0253548 A1* | 9/2016 | Dos Remedios | G06K 9/00013 382/125 |

FOREIGN PATENT DOCUMENTS

| | | |
|---|---|---|
| CN | 105068725 A | 11/2015 |
| CN | 105389566 A | 3/2016 |
| CN | 105426722 A | 3/2016 |
| CN | 105468945 A | 4/2016 |
| CN | 105469033 A | 4/2016 |
| CN | 105574383 A | 5/2016 |
| EP | 1452944 A2 | 9/2004 |
| EP | 3252639 A1 | 12/2017 |
| WO | 0184494 A1 | 11/2001 |

OTHER PUBLICATIONS

International Search Report issued in corresponding International Application No. PCT/CN2017/083872 dated Aug. 15, 2017 (12 pp).
Extended European Search Report issued in corresponding European Application No. 17170801.9 dated Jan. 2, 2018 (10 pp).

* cited by examiner

METHOD FOR CONTROLLING UNLOCKING AND TERMINAL

CROSS-REFERENCE TO RELATED APPLICATION(S)

This application claims priority to Chinese patent application no. 201610374129.8, filed on May 30, 2016, the content of which is incorporated by reference herein in its entirety.

Technical Field

The present disclosure relates to the field of electronic technology and particularly to a method for controlling unlocking and a terminal.

Background

Fingerprints are patterns formed on finger pulps at tail ends of fingers of human beings by concave-convex skin. The fingerprints of the human beings are formed under the co-action of nature and nurture, and are closely related to human health. Therefore, everybody has fingerprints which are different. The repetition rate of the fingerprints is extremely low to about one over 15 billion, so the fingerprints are known as "body ID". On the basis of this feature of the fingerprints, fingerprints are widely used as information for identity authentication.

For example, fingerprint recognition technology has become a standard configuration for products of mainstream terminal manufacturers. A fingerprint recognition process can be divided into feature extraction, data storage, and image matching. After an original fingerprint image of a human fingerprint is read by a fingerprint recognition sensor, feature point matching is performed between the fingerprint image and a pre-stored registration fingerprint template, and the terminal will be unlocked when the fingerprint image and a pre-stored registration fingerprint template are matched.

Unlocking speed directly affects the efficiency of use of a terminal user. At present, the unlocking speed has become a competitive factor of each manufacturer. How to shorten unlocking time so as to improve the unlocking efficiency has become an important research direction of a person skilled in the art.

BRIEF DESCRIPTION OF THE DRAWINGS

In order to illustrate the technical solutions of the related art or the implementations of the present disclosure more clearly, the drawings used in the description of the implementations or the related art will be briefly described, it will be apparent that the drawings described in the following are implementations of the present disclosure, and it will be apparent to those skilled in the art that other drawings can be obtained from the drawings without any creative work.

DETAILED DESCRIPTION

In order to make a person skilled in the art better understand the solutions of the present disclosure, the technical solutions in the implementations of the present disclosure will be described below clearly and completely in conjunction with the accompanying drawings in the implementations of the present disclosure. Obviously, the described implementations are some implementations of the present disclosure, not all of the implementations. On the basis of the implementations in the present disclosure, all other implementations obtained by a person skilled in the art without creative work should fall within the scope of protection of the present disclosure.

The terms "first", "second", "third", and "fourth" used in the specification, the claims, and the accompany drawings of the present disclosure are used for distinguishing between different objects rather than describing a particular order. The terms "include", "comprise", and "have" as well as variations thereof are intended to cover non-exclusive inclusion. For example, a process, method, system, product, or apparatus including a series of steps or units is not limited to the listed steps or units, it can optionally include other steps or units that are not listed; alternatively, other steps or units inherent to the process, method, product, or device can be included either.

The term "embodiment" or "implementation" referred to herein means that a particular feature, structure, or feature described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

In the following, some of the terms used herein are explained to facilitate the understanding for those skilled in the art.

Terminal

Terminal, also known as terminal device, terminal equipment or user equipment (UE), means an electronic device that provides voice and/or data connectivity to a user, examples of which can be hand-held devices with wireless connectivity function, on-board devices or the like. Common terminals can be, for example, mobile phones, tablets, laptops, handheld computers, mobile internet devices (MID), or wearable equipment such as smart watches, smart bracelets, and pedometers or others. Terminals in the present disclosure are not only limited to the common terminals, but can also be automated teller machines (ATM), ticket machines, entrance guard machines, medical equipment, or other terminals equipped with fingerprint recognition function.

Fingerprint Recognition Sensor

A fingerprint recognition sensor, also known as a fingerprint recognition module or fingerprint sensor, can realize the recognition of individual fingerprint features through a specific induction sensor. At present, the fingerprint recognition sensor is mainly divided into an optical fingerprint sensor, a capacitive fingerprint sensor, and a radio frequency (RF) fingerprint sensor. The fingerprint recognition sensor can be set in combination with a metal dome array (in other words, dome key) of a terminal, and can be set on the front surface, the race surface, or the side surface of the terminal, the present disclosure is not limited thereto. Similarly, the fingerprint recognition sensor can be set in combination with the touch screen of the terminal. For example, the fingerprint recognition sensor can be set below the touch panel of the touch screen.

Feature

Feature or characteristic refers to fingerprint features of a fingerprint image; the fingerprint feature includes overall features and local features. The overall features in turn include basic pattern patterns such as loop, arch, and whorl. The local features, also known as minutiae, node, or feature point, generally refer to an individual portion of the fingerprint or information representative thereof. Two fingerprints often have the same overall features, however, their local features, that is, the minutiae, cannot be exactly the same. Prints of a fingerprint are not continuous, smooth, or straight, but often break, bifurcated, or curved. These break points, bifurcation points, and turning points are called "minutiae", which can provide confirmation information of the uniqueness of a fingerprint. Minutiae on a fingerprint have the following four different properties. 1) ending, means an end of a print; 2) bifurcation, means the splitting of a print into two or more than two prints; 3) ridge divergence, means the separating of two parallel prints; 4) dot or island, means a particularly short print that become a little dot; 5) enclosure, means a small ring formed when a print separated into two prints and these two prints immediately merged into one. Fingerprint feature data still includes the follows: 1) short Ridge, means a print which is short but not so short to be a little dot; 2) orientation, means that a minutiae point can toward a certain direction; 3) curvature, describes the speed at which the orientation of a print changes; 4) position, which is described via (x, y) coordinates, can be absolute, or can be inductively recognized relative to triangular points or minutiae.

Fingerprint Template

Figure 8:
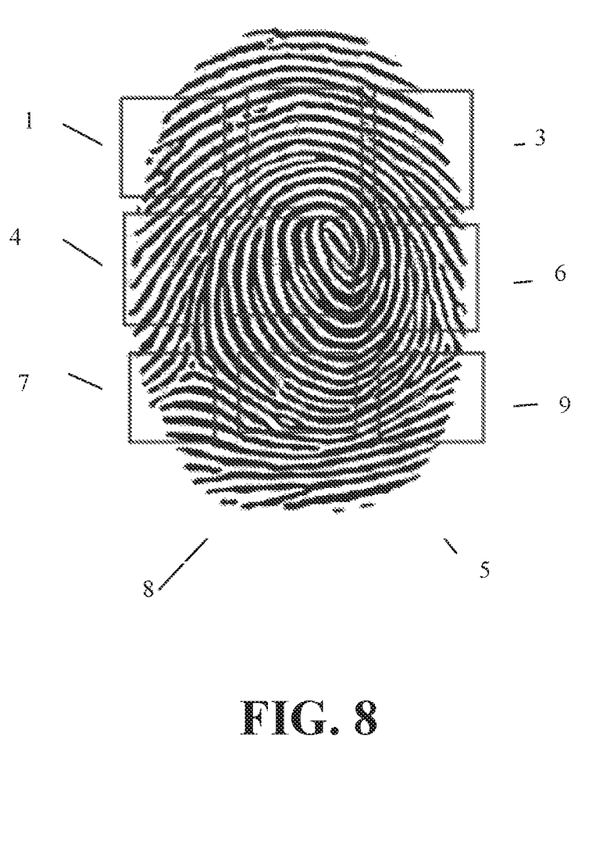
FIG. 8 is a schematic diagram illustrating an example of a fingerprint template.

The term "fingerprint template" and variants thereof, generally refers to a substantially complete fingerprint, or information representative thereof, collected from one or more nodes of a finger. For example, when a fingerprint function of a terminal such as a mobile phone is enabled for the first time, the user may be asked to undergo a fingerprint registration process; during the fingerprint registration, the user put his or her finger on a fingerprint sensor for fingerprint image acquisition or receiving by the fingerprint sensor, and fingerprint images received will be stored as a fingerprint template, usually, one finger corresponds to one fingerprint template; generally, the fingerprint sensor may receive 10-20 times for each finger in order to receive the whole or a majority of fingerprint face and generate a comprehensive fingerprint template. feature information can be obtained from the fingerprint image received, and for example, the fingerprint template can be saved in the form of image. FIG. 8 illustrates an exemplary fingerprint template, and the numbers marked in the fingerprint of FIG. 8 refers to minutiae.

Fingerprint Image

Fingerprint image generally refers to images collected or received by the fingerprint recognition sensor; fingerprint image data, fingerprint image information, fingerprint data, or fingerprint information generally refers to information or data of the fingerprint image, and can be stored locally in the terminal such as stored in a database or memory built into the terminal. When we refer to receiving or collecting fingerprint image, this can be understood as receiving fingerprint image information or fingerprint image data.

Besides, the terms "a plurality of" or "multiple" means two or more than two. The term "and/or" is used to describe the association of associated objects and indicates that there can be three relationships. For example, "A and/or B" means three situations, that is, A alone, both A and B, or B alone. The character "/" generally indicates that the associated objects before and after the character are in an "OR" relationship.

In order to better understand the method for controlling unlocking and the terminal disclosed in implementations of the present disclosure, the implementations of the present disclosure will be introduced in detail below.

According to an implementation of the present disclosure, there is provided a method for controlling unlocking, in which a reference feature point set of a finger of a user is acquired by scanning a finger of a user, and the acquired reference feature point set is compared with at least one template feature point of a pare-stored fingerprint template feature point set. The template feature point for matching or comparing is selected sequentially according to matching priority, the template feature point having the highest matching priority will be selected first, then the template feature point having the second highest matching priority will be selected, then the template feature point having the third highest matching priority will be selected, and so on. When the number of template feature points matched with the reference feature point set satisfies a preset condition, the terminal will be unlocked.

Figure 1:
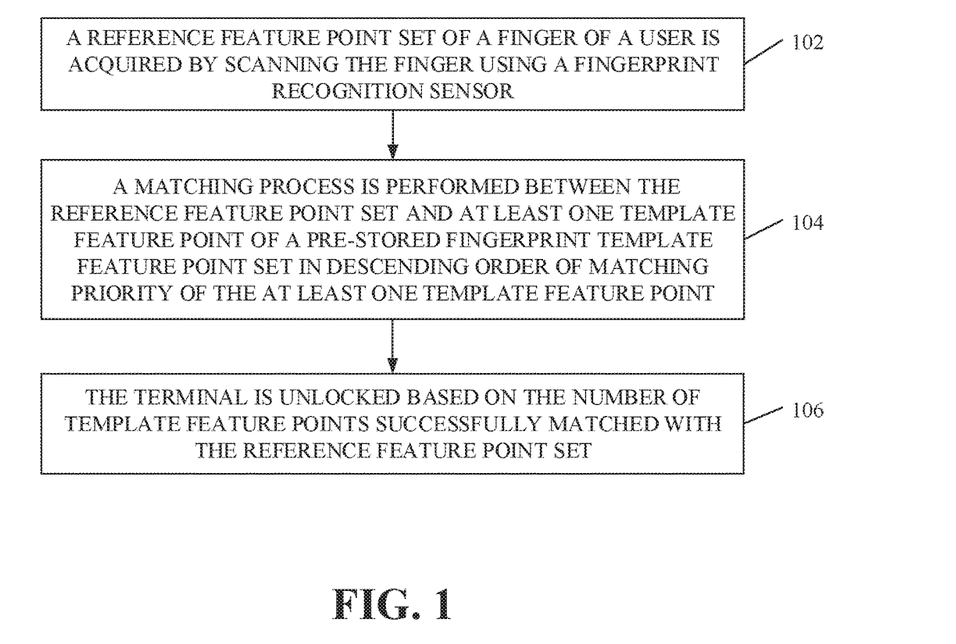
FIG. 1 is a flowchart illustrating a method for controlling unlocking according to an implementation of the present disclosure.

FIG. 1 is a flowchart illustrating a method for controlling unlocking according an implementation of the present disclosure. As illustrated in FIG. 1, the method can begin at block 102.

At block 102, a terminal acquires a reference feature point set of a finger of a user by scanning the finger through a fingerprint recognition sensor of a terminal. Generally, the operation at block 102 can be initiated whenever the finger of the user falls into a scanning range of the fingerprint recognition sensor, in other words, whenever the fingerprint recognition sensor is capable of scanning the finger. For example, the operation at block 102 can be initiated upon a touch operation of the finger on the fingerprint recognition sensor is detected. The "touch operation" referred to herein can be a conscious touch operation, or it can be an unconscious touch operation (also known as mis-touch), the present disclosure is not limited thereto. As one implementation, the terminal can first determine whether the scanning operation is initiated by a mis-touch operation and proceeds to block 102 when the scanning operation is initiated because the user intentionally touches the fingerprint recognition sensor, so as to ensure the safety of unlocking, improve the accuracy of unlocking, and save power of the terminal.

The terminal can be in a screen-off state or a screen-on and screen-locked state, the touch operation can be, for example, a pressing operation, a double-click operation or other touch operations, and are not uniquely limited to the implementation of the disclosure.

For example, the terminal can acquire the reference feature point set of the finger of the user by scanning the finger of the user through the fingerprint recognition sensor. As one implementation, the terminal cam wake up the fingerprint recognition sensor, acquire fingerprint data by scanning the finger of the user through the fingerprint recognition sensor, generate a fingerprint image according to the fingerprint data, and extract feature points of the fingerprint image to form the reference feature point set.

The fingerprint of the user includes rugged finger valleys and finger bulges, the terminal can calculate the specific distribution of the finger valleys and the finger bulges according to capacitance values formed between the finger valleys and the sensing electrodes of the fingerprint recognition sensor as well as capacitance values formed between the finger bulges and the sensing electrodes of the fingerprint recognition sensor. The specific working principle is as follows.

Each sensing electrode of the fingerprint recognition sensor is pre-charged to a reference voltage. When the finger contacts with a sensing electrode, since a finger bulge is convex and a finger valley is concave, a distance between the finger bulge and a plane of the sensing electrode is different from that between the finger valley and the plane of the sensing electrode. Based on a relationship between capacitance values and distances, capacitance values formed at positions of the finger bulges and the finger valleys will be different. A discharge current is used to discharge. Capacitance values corresponding to the finger bulge and the finger valley are different; therefore, the corresponding discharge speeds are different. The finger bulge is close to the sensing electrode, the capacitance value is relatively high and the discharge speed is relatively slow. The finger valley is far from the sensing electrode, the capacitance value is relatively low and the discharge speed is relatively fast. According to different discharge speeds, the positions of the finger bulges and the finger valleys can be determined, whereby fingerprint image data corresponding to the finger of the user is generated.

As one implementation, the terminal can acquire the fingerprint data by scanning the finger of the user through the fingerprint recognition sensor as follows.

The fingerprint recognition sensor includes $n1$ abnormal sensing electrodes and $n2$ normal sensing electrodes, where $n1$ and $n2$ are positive integers. The terminal acquires $n2$ underlying data through $n2$ normal sensing electrodes of the fingerprint recognition sensor; the terminal determines $n1$ reference underlying data corresponding to the $n1$ abnormal sensing electrodes according to the $n2$ underlying data acquired through the $n2$ normal sensing electrodes, the $n1$ reference underlying data and the $n2$ underlying data are configured to form the fingerprint data.

The manner in which the $n1$ reference underlying data is determined based on the $n2$ underlying data includes but not limited to the follows.

Manner 1

A first average value of the $n2$ underlying data is calculated. The first average value is determined as each of the $n1$ reference underlying data corresponding to the $n1$ abnormal sensing electrodes. In other words, the first average value is assigned to each of the $n1$ reference underlying data.

As can be seen, the terminal can correct abnormal underlying data acquired through the abnormal sensing electrodes, which is conductive to the improvement of the accuracy of fingerprint data, and therefore, unlocking security can be enhanced.

Manner 2

A coordinate value of each of the $n1$ abnormal sensing electrodes is acquired. An averaging process is performed on each abnormal sensing electrode according to the coordinate value of each abnormal sensing electrode and the $n2$ underlying data, so as to obtain $n1$ reference underlying data corresponding to the $n1$ abnormal sensing electrodes.

The averaging process can be executed as follows. At least one sensing electrode is determined from the $n2$ normal sensing electrodes, the distance between each of the determined at least one sensing electrode and the abnormal sensing electrode currently undergoing the averaging process is less than a default distance; a second average value of the at least one underlying data corresponding to the at least one sensing electrode is calculated, and the second average value is determined as the reference underlying data of the abnormal sensing electrode that is currently undergoing the averaging process.

As can be seen, similarly, the terminal can correct abnormal underlying data acquired through the abnormal sensing electrodes, which is conductive to the improvement of the accuracy of fingerprint data, and therefore, unlocking security can be enhanced.

Before the touch operation on the fingerprint recognition sensor of the terminal is detected, following operations can be executed to determine the matching priority of each template feature point in the pre-stored template feature point set. N feature point sets of N fingerprint images that successfully unlocked the terminal for N times are acquired, wherein one fingerprint image corresponds to one feature point set, N is an integer greater than 1. The number of times of successful matching of each template feature point in the fingerprint template feature point set is determined according to the N feature point sets and the fingerprint template feature point set. The matching priority of each template feature point is determined according to the number of times of successful matching of each template feature point.

At block 104, the terminal matches the reference feature point set with at least one template feature point of a pre-stored fingerprint template feature point set in descending order of matching priority of the at least one template feature point.

Each template feature point of the pre-stored fingerprint template feature point set has positively correlated matching priority and probability of matching. For example, a probability of matching of a template feature point having a higher matching priority is greater than that of a template feature point having a lower matching priority. In other words, the higher the matching priority, the greater the probability of matching, and vice versa. Please refer to the fingerprint template in FIG. 8, feature points in area marked as 5, which corresponds to the central portion of a finger, may have higher matching priority than those in other areas, and therefore, feature points in area 5 may be selected for matching first.

At block 106, the terminal is unlocked based on the number of template feature points successfully matched with the reference feature point set. As one implementation, the terminal may be unlocked when the number of template feature points successfully matched with the reference feature point set is greater than or equal to a preset threshold. The preset threshold can be configured in advance in the system as needed.

All feature points of the fingerprint of the finger of the user are pre-stored in the fingerprint template feature point set of the terminal as comprehensive as possible. One example of the fingerprint template is illustrated in FIG. 8. Therefore, the number of fingerprint template feature points stored in the terminal is relatively large, for example, can be 200, 210 or even over 300. However, during an actual fingerprint unlocking process, generally, about 20 valid feature points of the fingerprint of the user are used to recognize the identity of the user and execute unlocking operation. Based on this, the preset threshold can be 20 for example.

During the matching process, the terminal, specifically, the fingerprint recognition sensor or fingerprint recognition module or other functional units, has to determine whether a template feature point (marked as template feature point P for example) is matched with the reference feature point set, so as to further count the number of template feature points that is matched successfully. To this end, for each feature point in the reference feature point set, the terminal may calculate a matching degree between template feature point P and this feature point in the reference feature point set.

For template feature point P, when there is at least one feature point whose matching degree with template feature point P is greater than a default threshold in the reference feature point set, it is determined that template feature point P is successfully matched with the reference feature point set successfully. For example, when matching maximally, the matching degree is 1, so the second preset threshold can be 95%, 96%, 97%, 98%, or 99%, and so on. Further, when the number of template feature points successfully matched with the reference feature point set is greater than the default threshold, it can be considered that the matching is successful, and the terminal can be unlocked.

When the terminal is unlocked, the terminal can load a system application desktop thereof. Alternatively, the terminal can load and display an application interface of an application being interrupted by the previous screen-off operation of the terminal.

As can be seen, compared with using all template feature points in a fingerprint template feature point set to match the reference feature point set of the finger of the user in the related art, in the method for controlling fingerprint unlocking according to implementations of the present disclosure, the terminal can match the reference feature point set with at least one template feature point in the pre-stored fingerprint template feature point set in descending order of matching priority of the at least one template feature point. Since a probability of matching of a template feature point having a higher matching priority is greater than that of a template feature point having a lower matching priority, the terminal can use template feature points as less as possible for matching. Therefore, the overall matching time of template feature points can be shortened, the speed of fingerprint unlocking of the terminal can be improved, and user experience can be improved as well.

As can be seen, in implementations of the present disclosure, the terminal counts the number of times of successful matching of each template feature point in the fingerprint template feature point set according to N feature point sets of N fingerprint images that successfully unlocked the terminal for N times, which is in strong correlation with the finger of the user. And then, the terminal determines the matching priority of each template feature point according to the number of times of successful matching of each template feature point, that is to say, a probability of matching of a template feature point which is compared with the reference feature point set first is greater than a probability of matching of a template feature point which is compared with the reference feature point set last. So the terminal only needs to match template feature points as less as possible to acquire enough number of matched template feature points to confirm the identity of the user, which improves the speed of fingerprint unlocking.

Figure 2:
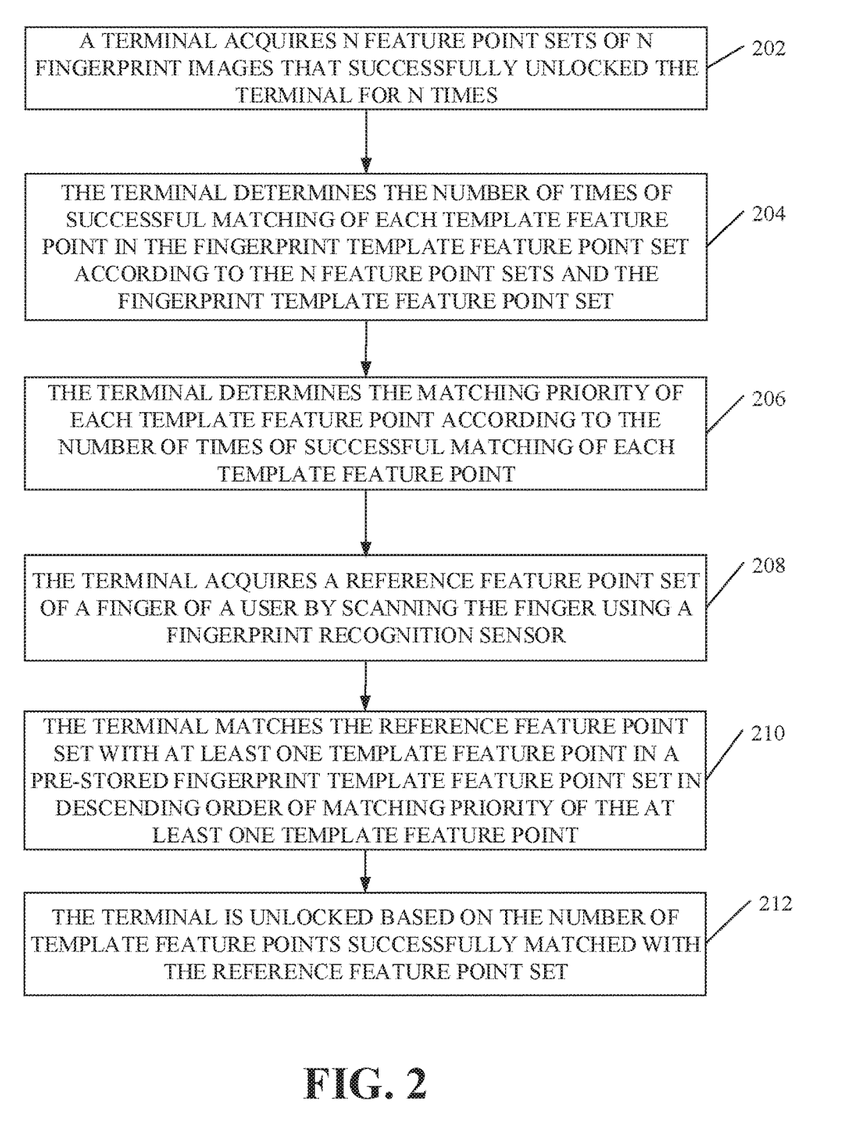
FIG. 2 is another flowchart illustrating the method for controlling unlocking according to an implementation of the present disclosure.

FIG. 2 is another flowchart illustrating the method for controlling unlocking according an implementation of the present disclosure. As illustrated in FIG. 2, the present method for controlling unlocking can begin at block 202.

At block 202, a terminal acquires N feature point sets of N fingerprint images that successfully unlocked the terminal for N times, one fingerprint image corresponds to one feature point set, N is an integer greater than 1.

At block 204, the terminal determines the number of times of successful matching of each template feature point in the fingerprint template feature point set according to the N feature point sets and the fingerprint template feature point set. The terminal may compare each template feature point in the fingerprint template feature point set with the N feature point sets so as to determine the number of times of successful matching.

At block 206, the terminal determines the matching priority of each template feature point according to the number of times of successful matching of each template feature point. The greater the number of times of successful matching, the higher the matching priority.

At block 208, the terminal acquires a reference feature point set of a finger of a user by scanning the finger through a fingerprint recognition sensor of the terminal.

At block 210, the terminal matches the reference feature point set with at least one template feature point of a pre-stored fingerprint template feature point set in descending order of matching priority of the at least one template feature point, where a probability of matching of a template feature point having a higher matching priority is greater than a probability of matching of a template feature point having a lower matching priority.

At block 212, the terminal is unlocked based on the number of template feature points successfully matched with the reference feature point set. For example, the terminal is unlocked when the number of template feature points successfully matched with the reference feature point set satisfies a default condition.

Figure 3:
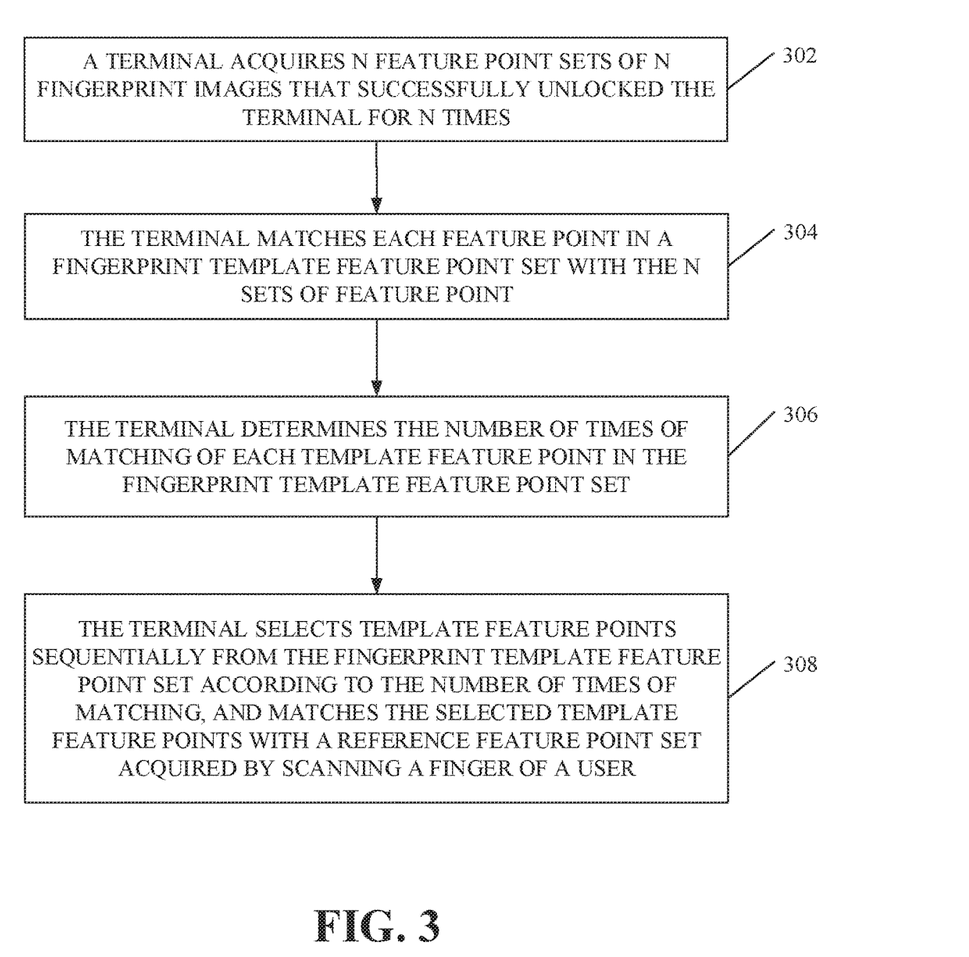
FIG. 3 is a flowchart illustrating another method for controlling unlocking according to an implementation of the present disclosure.

FIG. 3 is a flowchart illustrating another method for controlling unlocking according an implementation of the present disclosure. As illustrated in FIG. 3, the present method can begin at block 302.

At block 302, a terminal acquires N feature point sets of N fingerprint images that successfully unlocked the terminal for N times.

At block 304, the terminal matches each feature point in a fingerprint template feature point set with the N feature point sets.

At block 306, the terminal determines the number of times of successful matching of each feature point in the fingerprint template feature point set.

At block 308, the terminal selects template feature points sequentially from the fingerprint template feature point set according to the number of times of successful matching, and matches the selected template feature points with a reference feature point set acquired by scanning a finger of a user. Thereafter, the terminal is unlocked when the number of template feature points successfully matched with the reference feature point set satisfies a default condition, such as greater than a preset threshold.

In at least one implementation of the present disclosure, the manner in which the terminal selects template feature points sequentially from the fingerprint template feature point set according to the number of times of matching, includes but not limited to: the terminal selects template feature points in descending order of the number of times of matching, which means that the template feature point with the greatest number of times of matching will be selected first, then the template feature point with the second greatest number of times of matching will be selected, and so on. For easy of explanation, take selecting one feature point at a time for example, however, the present disclosure is not limited thereto. For example, two or even more than two feature points having the greatest or relatively greater number of times of matching can be selected at a time.

Figure 4:
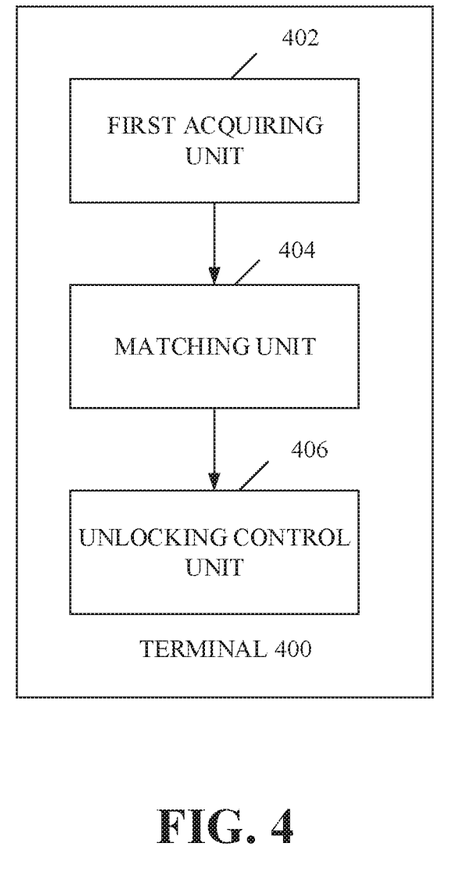
FIG. 4 is a block diagram illustrating a terminal according to an implementation of the present disclosure.

In the following, a terminal is provided. The terminal of the present disclosure is used to execute the foregoing method of the present disclosure. FIG. 4 is a block diagram illustrating the terminal according to an implementation of the present disclosure. As illustrated in FIG. 4, a terminal 400 can includes a first acquiring unit 402, a matching unit 404, and an unlocking control unit 406.

The first acquiring unit 402 is configured to acquire a reference feature point set of a finger of a user by scanning the finger. For example, the first acquiring unit 402 can acquire the reference feature point set of the finger by scanning the finger via a fingerprint recognition sensor, when the touch operation on the fingerprint recognition sensor is detected.

The matching unit 404 is configured to compare the reference feature point set with at least one template feature point of a pre-stored fingerprint template feature point set in descending order of matching priority of the at least one template feature point; each template feature point of the pre-stored fingerprint template feature point set has positively correlated matching priority and probability of matching. For example, a probability of matching of a template feature point having a higher matching priority is greater than a probability of matching of a template feature point having a lower matching priority.

In at least one implementation, the matching unit 404 is further configured to count the number of template feature points successfully matched with the reference feature point set; a template feature point in the pre-stored fingerprint template feature point set is successfully matched with the reference feature point set when the reference feature point set contains at least one target feature point, among which a matching degree between the target feature point and the template feature point is greater than a first preset threshold.

The unlocking control unit 406 is configured to unlock the terminal based on the number of template feature points matched with the reference feature point set.

In at least one implementation, the first acquiring unit 402 is further configured to scan the finger of the user to acquire fingerprint data, generate a fingerprint image based on the fingerprint data, and extract feature points of the fingerprint image to form the reference feature point set.

The fingerprint recognition sensor generally includes n1 abnormal sensing electrodes and n2 normal sensing electrodes, n1 and n2 are positive integers. In at least one implementation, the first acquiring unit 402 is further configured to acquire n2 underlying data through the n2 normal sensing electrodes, and determine n1 reference underlying data corresponding to the n1 abnormal sensing electrodes according to the n2 underlying data acquired through the n2 normal sensing electrodes, the n1 reference underlying data and the n2 underlying data are configured to form the fingerprint data.

In at least one implementation, in order to determine the n1 reference underlying data, the first acquiring unit 402 is further configured to calculate a first average value of the n2 underlying data, and determine the first average value as each of the n1 reference underlying data corresponding to the n1 abnormal sensing electrodes. Alternatively, the first acquiring unit 402 is further configured to acquire a coordinate value of each of the n1 abnormal sensing electrodes, perform an averaging process on each abnormal sensing electrode according to the coordinate value of each abnormal sensing electrode and the n2 underlying data, so as to obtain the n1 reference underlying data corresponding to the n1 abnormal sensing electrodes.

In at least one implementation, in order to execute the averaging process, the first acquiring unit 402 is further configured to determine at least one sensing electrode from the n2 normal sensing electrodes, wherein the distance between each of the at least one sensing electrode and the abnormal sensing electrode currently undergoing the averaging process is less than a default distance, calculate a second average value of the at least one underlying data corresponding to the at least one sensing electrode, and determine the second average value as the reference underlying data of the abnormal sensing electrode that is currently undergoing the averaging process.

In at least one implementation, the unlocking control unit 406 is further configured to load a system application desktop of the terminal, or load an application interface of an application being interrupted by the previous screen-off operation of the terminal.

Figure 5:
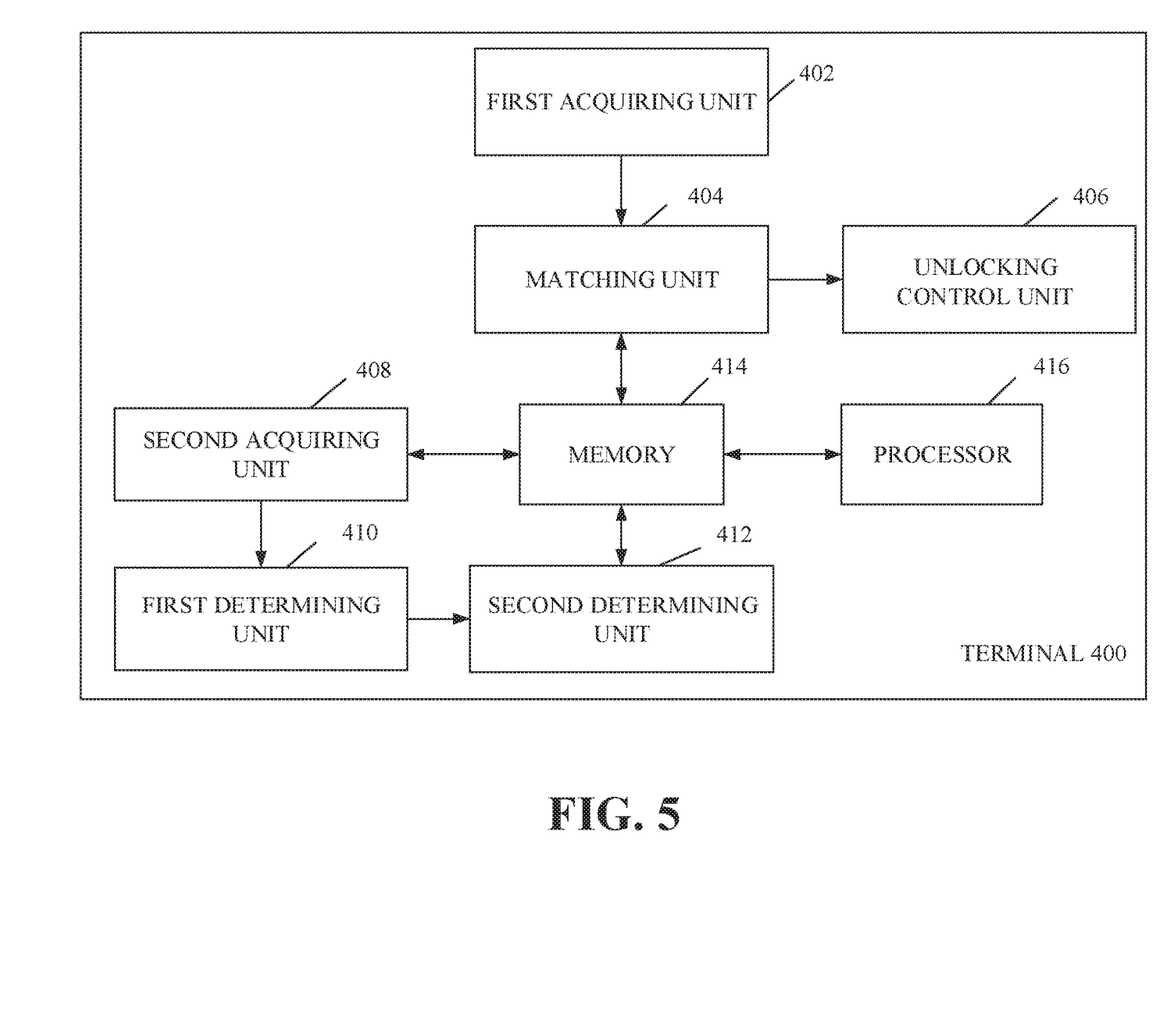
FIG. 5 is another block diagram illustrating the terminal according to an implementation of the present disclosure.

FIG. 5 is a block diagram illustrating a terminal according an implementation of the present disclosure. As illustrated in FIG. 5, the terminal 400 may further include a second acquiring unit 408, a first determining unit 410, and a second determining unit 412.

The second acquiring unit 408 is configured to acquire N feature point sets of N fingerprint images configure to successfully unlock the terminal for N times, one fingerprint image corresponds to one feature point set, where N is an integer greater than 1.

The first determining unit 410 is configured to determine, based on the N feature point sets and the fingerprint template feature point set, the number of times of matching of each template feature point in the fingerprint template feature point set.

The second determining unit 412 is configured to determine, based on the number of times of matching of each template feature point, the matching priority of each template feature point. Based on the matching priority determined by the second determining unit 412 and pre-stored template feature point set read out from a memory 414, the matching unit 404 can perform the matching process. As can be seen from FIG. 5, the memory 414 can be connected with a processor 416.

It shall be noted that, the terminal described in the device implementation of the present disclosure is illustrated in the form of functional units. The term "unit" used herein shall be taken in the broadest possible sense. Objects for realizing the function of each unit can be an application specific integrated circuit (ASIC), a single circuit, a processor (shared, specific, or chipset) for executing one or more software or hardware procedures, a memory, a combined logic circuit, and/or other appropriate assembly for realizing the above function.

Figure 6:
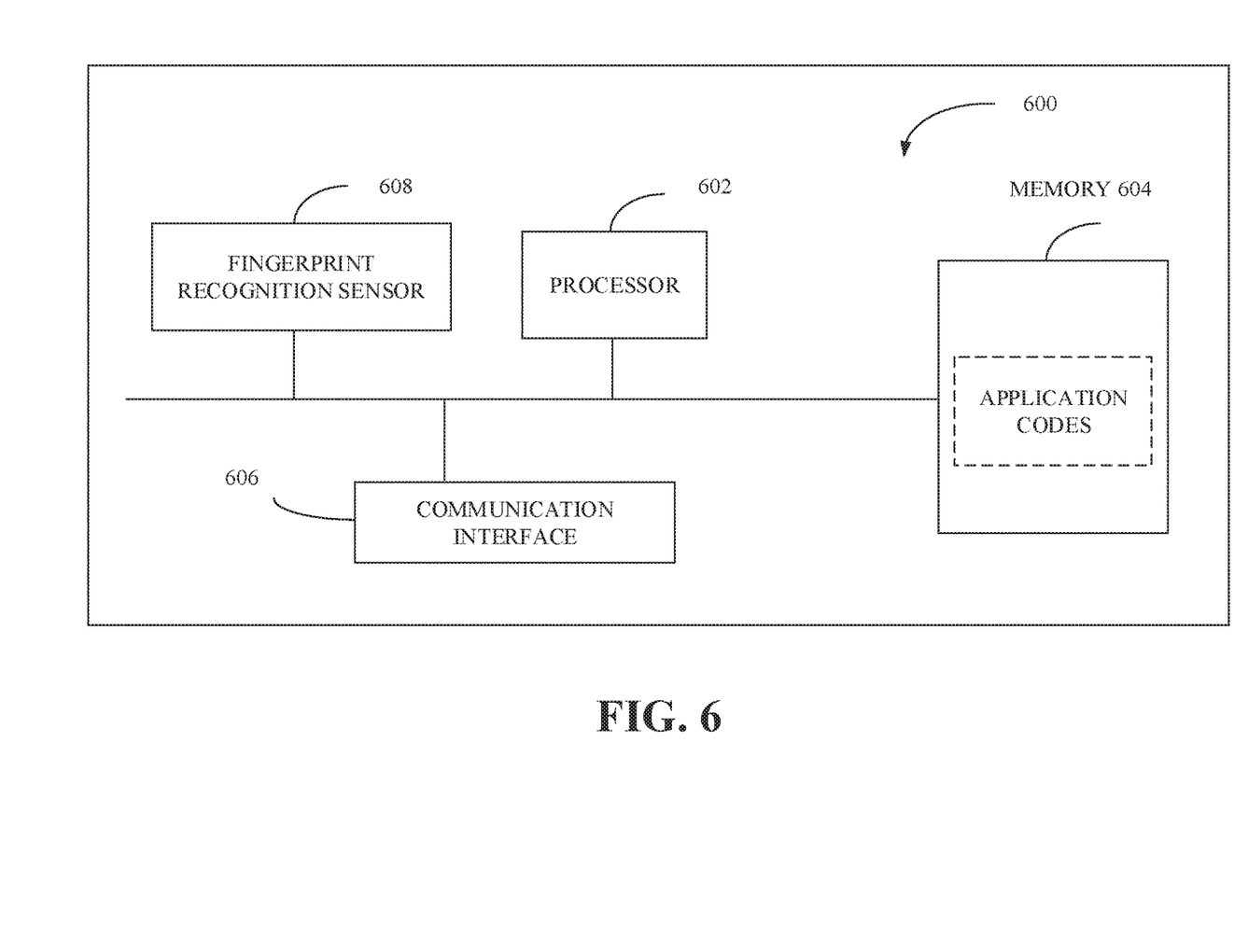
FIG. 6 is a structure schematic diagram illustrating a terminal according to an implementation of the present disclosure.

FIG. 6 is a structure schematic diagram illustrating a terminal according to an implementation of the present disclosure.

As illustrated in FIG. 6, a terminal 600 may be implemented in the structure of FIG. 6, and the terminal 600 may include at least one processor 602, at least one memory 604, at least one communication interface 606, and a fingerprint recognition sensor 608. The processor 602, the memory 604, the fingerprint recognition sensor 608, and the communication interface 606 can connect and communicate with each other via a communication bus. For example, the operation that the matching unit 404 matches the reference feature point set can be realized by the terminal of FIG. 6. For example, the processor 602 can invoke template feature points in fingerprint template feature point set stored in a memory 604 to match the reference feature point set.

The processor 602 may be one of a central processing unit (CPU), a micro-processor, an application-specific integrated circuit (ASIC), or one or more integrated circuits for controlling the programs for the implementation of above-mentioned technical solutions.

The memory 604 may be a read-only memory (ROM) or other types of static storage devices that can store static information and instructions, random access memory (RAM) or other types of dynamic storage devices that can store information and instructions, or may be electrically erasable programmable read-only memory (EEPROM), compact disc read-only memory (CD-ROM) or other disc storage media, disc storage media (including compact discs, laser discs, compact discs, digital versatile discs, Blue-ray discs and the like), disk storage media or other magnetic storage devices, or may be any other media that can be used to carry or store desired program code in the form of instructions or data structures and that can be accessed by a computer. The present disclosure is not limited thereto. The memory can exist independently and connect to the processor 602 via the communication bus. The memory can also be integrated with the processor 602.

The memory 604 is configured to store application codes that executes the above-mentioned technical schemes and is controlled by the processor 602. The processor 602 is configured to execute the application codes stored in the memory 604.

The communication interface 606 is configured to communicate with other devices or communication networks such as Ethernet, radio access network (RAN), wireless local area network (WLAN) and the like.

The programs codes stored in the memory 604 can be used to perform the method for controlling unlocking of a terminal as illustrated in FIG. 1 to FIG. 3. For example, a reference feature point set of a finger of a user is acquired by scanning the finger through a fingerprint recognition sensor, upon a touch operation of the finger on the fingerprint recognition sensor is detected. A matching process is performed between the reference feature point set and at least one template feature point of a pre-stored fingerprint template feature point set in descending order of matching priority of the at least one template feature point, each template feature point of the pre-stored fingerprint template feature point set has positively correlated matching priority and probability of matching. The terminal is unlocked based on the number of template feature points successfully matched with the reference feature point set.

Figure 7:
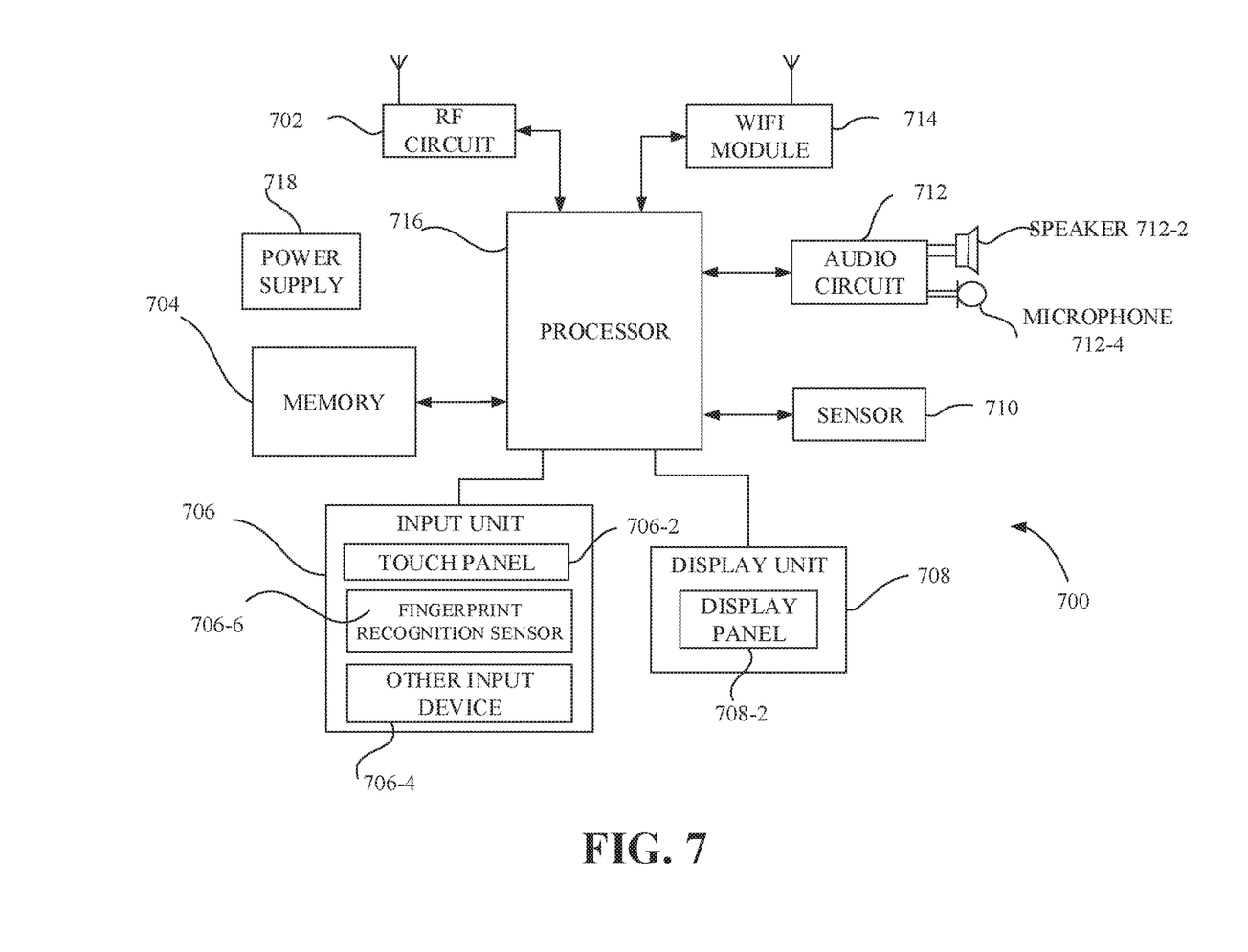
FIG. 7 is a structure schematic diagram illustrating another terminal according to an implementation of the present disclosure.

The implementation of the present disclosure further provides a more specific application scenario in which the terminal is a mobile phone and the following describes components of the mobile phone in detail with refer to FIG. 7. As illustrated in FIG. 7, a mobile phone 700 can includes a RF (radio frequency) circuit 702, a memory 704, an input unit 706, a display unit 708, a sensor 710, an audio circuit 712, a Wi-Fi module 714, a processor 716, and a power supply 718. The input unit 706 further includes a touch panel 706-2, other input devices 706-4, and a fingerprint recognition sensor 706-6. The display unit 708 includes a display panel 708-2. The audio circuit 712 is connected with a speaker 712-2 and a microphone 712-4.

The RF circuit 702 is configured for receiving and transmitting signals or transmitting or receiving information during a call, and in particular, receiving downlink information of a base station and transferring the downlink information to the processor 716 for processing, and transmitting uplink data to the base station. Generally, the RF circuit 702 includes but not limited to an antenna, at least one amplifier, a transceiver, coupler, low noise amplifier (LNA), duplexer and the like. In addition, the RF circuit 702 may also communicate with the network and other devices by wireless communication. The above wireless communication may use any communication standard or protocol, which includes but not limited to Global System of mobile communication (GSM), general packet radio service (GPRS), code division multiple access (CDMA), wideband code division multiple access (WCDMA), long term evolution (LTE), E-mail, short messaging service (SMS) and so on.

The memory 704 may be configured to store software programs and modules, and the processor 716 executes various function applications and data processing of the mobile phone by running the software programs and the modules stored in the memory 704. The memory 704 may mainly include a program storage region and a data storage region, the storage program region may store an operation system, application programs needed for at least one function (a fingerprint scanning function, a fingerprint matching function, and an unlocking function) and so on; and the data storage region may store data (such as fingerprint data received by a fingerprint recognition sensor, underlying data for storing a fingerprint image received) created according to use of the mobile phone, and so on. In addition, the memory 704 may include a high-speed RAM, and may further include a non-volatile memory such as one of at least a disk storage device, a flash device, or other non-volatile solid storage devices.

The input unit 706 may be configured to receive input digital or character information and generate key signal input associated with user setting and functional control of the mobile phone. Specifically, the input unit 706 may include a touch panel 706-2, other input devices 706-4 and a fingerprint recognition sensor 706-6. The touch panel 706-2, also referred to as a touch screen, may receive a touch operation of the user thereon or nearby (e.g., operation on or near the touch panel 706-2 by a user using a finger or stylus, or any suitable object or attachment), and drive a corresponding connection device according to a preset program. The touch panel 706-2 may include a touch detection device and a touch controller. The touch detection device detects the touching position of the user and detects a signal resulted from the touch operation, and transmits the signal to the touch controller. The touch controller receives the touch information from the touch detection device and converts the information into contact coordinates and sends it to the processor 716, the touch controller can receive and execute the command sent by the processor 716. In addition, the touch panel 706-2 can be realized using various types such as resistive, capacitive, infrared, and surface acoustic waves.

In addition to the touch panel 706-2, the input unit 706 may still include other input devices 706-4. The other input devices 706-4 may include, but is not limited to, at least one of a physical keyboard, a function key (such as volume control buttons, switch buttons and so on), a trackball, a mouse, and a joystick. The fingerprint recognition sensor 706-6 may be provided in conjunction with the dome key of the terminal or can be provided in combination with the touch panel 706-2. For example, the fingerprint recognition sensor 706-6 is provided below the touch panel 706-2, when a finger of the user touches the touch panel of the terminal, the fingerprint recognition sensor 706-6 below the touch panel 706-2 can receive a fingerprint image of the finger of the user.

The display unit 708 may be configured to display information input by the user or information provided for the user or various menus of the mobile phone. The display unit 708 may include a display panel 708-2, and alternatively, the display panel 708-2 may be configured in the form of a liquid crystal display (LCD), an organic light-emitting diode (OLED) and so on. Further, the touch panel 706-2 may cover the display panel 708-2. When the touch panel 706-2 detects a touch operation (touch event) thereon or nearby, information of the touch operation can be transmitted to the processor 716 so as to determine the type of the touch event. The processor 716 provides corresponding visual output on the display panel 708-2 according to the type of the touch event. Although in FIG. 7, the touch panel 706-2 and the display panel 708-2 are used as two separate components to realize the input and output functions of the mobile phone, in some implementations, the touch panel 706-2 may be integrated with the display panel 708-2 to implement the input and output functions of the mobile phone.

The mobile phone may also include at least one sensor 710, such as a light sensor, a motion sensor, and other sensors. Specifically, the light sensor may include an ambient light sensor and a proximity sensor, among which the ambient light sensor may adjust the brightness of the display panel 708-2 according to ambient lights, and the proximity sensor may turn off the display panel 708-2 and/or backlight when the mobile phone reaches nearby the ear. As a kind of motion sensor, the accelerometer sensor can detect the magnitude of acceleration in all directions (typically three axes, that is, x, y, and z); when stationary, the accelerometer sensor can detect the magnitude and direction of gravity when stationary; the accelerometer sensor can also identify the application of mobile gestures (such as vertical and horizontal screen switch, related games, magnetometer attitude calibration), or the accelerometer sensor can be used for vibration recognition of related functions (such as a pedometer, percussion) and so on. The mobile phone can also be equipped with a gyroscope, barometer, hygrometer, thermometer, infrared sensor and other sensors, and will not repeat here.

The audio circuit 712, the speaker 712-2, the microphone 712-4 may provide an audio interface between the user and the terminal. The audio circuit 712 may convert the received audio data into electrical data and transfer the electrical data to the speaker 712-2; thereafter the speaker 712-2 converts the electrical data into a sound signal for output. On the other hand, the microphone 712-4 converts the received sound signal into an electrical signal which will be received by the audio circuit 712 and converted into audio data to output to the processor 716, the audio data is processed by the processor 716 and transmitted via an RF circuit 702 to, for example, another mobile phone, or, the audio data is output to the memory 704 for further processing.

Wi-Fi belongs to a short-range wireless transmission technology, the mobile phone may assist the user in E-mail receiving and sending, webpage browsing, access to streaming media and the like by means of the Wi-Fi module 714; Wi-Fi provides users with wireless broadband Internet access. Although illustrated in FIG. 7, it should be understood that the Wi-Fi module 714 is not a necessary part of the mobile phone and can be omitted according to actual needs without departing from the essential nature of the present disclosure.

The processor 716 is the control center of the mobile phone, it uses various interfaces and lines to connect various parts of the mobile phone, runs or executes software programs and/or modules stored in the memory 704, and calls data stored in the memory 704 to perform various functions of the mobile phone and process data, thereby monitoring the mobile phone. In at least one implementation, the processor 716 may include one or more processing units; for example, the processor 716 may integrate an application processor and a modem processor, wherein the application processor handles the operating system, the user interface, the application, and so on, and the modem processor mainly processes wireless communication. It will be appreciated that the above-mentioned modem processor may not be integrated into the processor 716.

The mobile phone also includes a power supply 718 (e.g., a battery) that supplies power to various components. For instance, the power supply 718 may be logically connected to the processor 716 via a power management system to enable management of charging, discharging, and power consumption through the power management system. Although not illustrated, the mobile phone may include a camera, a Bluetooth module, etc., and will not be elaborated here. The method of each step in the foregoing implementations can be realized based on the configuration of the terminal illustrated in FIG. 7. The function of each unit in the foregoing implementations can be implemented based on the configuration of the terminal illustrated in FIG. 7.

The implementations of the present disclosure also provide a computer readable storage medium. The computer readable storage medium may store one or more program, and the program can execute some or all of the steps of any unlocking control method in the method implementation.

It is to be noted that, for the sake of simplicity, the foregoing method implementations are described as a series of action combinations, however, it will be appreciated by those skilled in the art that the present disclosure is not limited by the sequence of actions described. That is because that, according to the present disclosure, certain steps may be performed in other order or simultaneously. Also, it will be appreciated by those skilled in the art that the implementations described in the specification are exemplary implementations and the actions and modules involved are not necessarily necessary for the present disclosure.

In the foregoing implementations, descriptions of each implementation are emphasized respectively, and parts which are not elaborated in a certain implementation may subject to relevant descriptions of other implementations.

The apparatus disclosed in implementations provided herein may be implemented in other ways. For example, the device/apparatus implementations described above are merely illustrative; for instance, the division of the unit is only a logical function division and there can be another way of division during actual implementations, for example, multiple units or components may be combined or may be integrated into another system, or some features may be ignored or not performed. In addition, coupling or communication connection between each displayed or discussed component may be direct coupling or communication connection, or may be indirect coupling or communication among devices or units via some interfaces, and may be electrical and mechanical or adopt other forms.

The units described as separate components may or may not be physically separate, the components shown as units may or may not be physical units, and namely they may be in the same place or may be distributed to multiple network elements. Part or all of the units may be selected per actual needs to achieve the purpose of the technical solutions of the implementations.

In addition, the functional units in various implementations of the present disclosure may be integrated in one processing unit, or each unit may be physically present, or two or more units may be integrated in one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory described above includes a variety of media that can store programs codes, such as a USB disk, a read-only memory (ROM), a random-access memory (RAM), a mobile hard disk, a magnetic disk, or an optical disk and so on.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or CD, and so on.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for controlling unlocking, comprising:
    scanning a finger of a user using a fingerprint recognition sensor of a terminal to acquire fingerprint data;
    acquiring a reference feature point set of the finger of the user by scanning the finger using the fingerprint recognition sensor of the terminal;
    matching the reference feature point set with at least one template feature point of a pre-stored fingerprint template feature point set in a descending order of matching priority of the at least one template feature point, wherein each template feature point of the pre-stored fingerprint template feature point set comprises positively correlated matching priority and probability of matching; and
    unlocking the terminal based on a number of the at least one template feature point successfully matched with the reference feature point set;
    wherein scanning the finger of the user using the fingerprint recognition sensor to acquire fingerprint data comprises:
    acquiring n2 underlying data using n2 normal sensing electrodes of the fingerprint recognition sensor, wherein the fingerprint recognition sensor comprises n1 abnormal sensing electrodes and the n2 normal sensing electrodes, n1 and n2 being positive integers; and
    determining n1 reference underlying data corresponding to the n1 abnormal sensing electrodes according to the n2 underlying data acquired using the n2 normal sensing electrodes, wherein the n1 reference underlying data and the n2 underlying data are configured to form the fingerprint data.

2. The method of claim 1, wherein the at least one template feature point in the pre-stored fingerprint template feature point set is successfully matched with the reference feature point set when the reference feature point set comprises at least one target feature point, and a matching degree between the at least one target feature point and the at least one template feature point is greater than a first preset threshold.

3. The method of claim 1, further comprising:
    prior to acquiring the reference feature point set, acquiring N feature point sets of N fingerprint images that successfully unlocked the terminal for N times, wherein one fingerprint image corresponds to one feature point set, and N is an integer greater than 1;
    determining a number of times of successful matching of each template feature point in the pre-stored fingerprint template feature point set according to the N feature point sets and the pre-stored fingerprint template feature point set; and
    determining matching priority of each template feature point according to the number of times of successful matching of each template feature point.

4. The method of claim 1, wherein acquiring the reference feature point set of the finger of the user by scanning the finger using the fingerprint recognition sensor comprises:
    generating a fingerprint image based on the fingerprint data; and
    extracting feature points of the fingerprint image to form the reference feature point set.

5. The method of claim 1, wherein determining the n1 reference underlying data corresponding to the n1 abnormal sensing electrodes according to the n2 underlying data acquired using the n2 normal sensing electrodes comprises:
    calculating a first average value of the n2 underlying data; and determining the first average value as each of the n1 reference underlying data corresponding to the n1 abnormal sensing electrodes.

6. The method of claim 1, wherein determining the n1 reference underlying data corresponding to the n1 abnormal sensing electrodes according to the n2 underlying data acquired using the n2 normal sensing electrodes comprises:
    acquiring a coordinate value of each of the n1 abnormal sensing electrodes; and performing an averaging process on each abnormal sensing electrode according to a coordinate value of each abnormal sensing electrode and the n2 underlying data to obtain the n1 reference underlying data corresponding to the n1 abnormal sensing electrodes.

7. The method of claim 6, wherein the averaging process comprises:
    determining at least one sensing electrode from the n2 normal sensing electrodes, wherein a distance between each of the at least one sensing electrode and the abnormal sensing electrode that is currently undergoing the averaging process is less than a default distance;

and calculating a second average value of at least one underlying data corresponding to the at least one sensing electrode, and determining the second average value as the reference underlying data of the abnormal sensing electrode that is currently undergoing the averaging process.

8. The method of claim 1, wherein unlocking the terminal comprises at least one of:

loading a system application desktop of the terminal;

loading an application interface of an application being interrupted by a previous screen-off operation of the terminal; and unlocking the terminal when the number of the at least one template feature point successfully matched with the reference feature point set is greater than a second preset threshold.

9. A terminal, comprising:

one or more hardware processors comprising:

a first acquiring unit, configured to scan a finger of a user to acquire fingerprint data; acquire a reference feature point set of the finger of the user by scanning the finger;

a matching unit, configured to compare the reference feature point set with at least one template feature point of a pre-stored fingerprint template feature point set in a descending order of matching priority of the at least one template feature point, wherein each template feature point of the pre-stored fingerprint template feature point set comprises positively correlated matching priority and probability of matching; and an unlocking control unit, configured to unlock the terminal based on a number of the at least one template feature point successfully matched with the reference feature point set;

wherein the first acquiring unit that is configured to acquire the fingerprint data is further configured to:

acquire n2 underlying data using n2 normal sensing electrodes of the fingerprint recognition sensor, wherein the fingerprint recognition sensor comprises n1 abnormal sensing electrodes and the n2 normal sensing electrodes, n1 and n2 are positive integers; and determine n1 reference underlying data corresponding to the n1 abnormal sensing electrodes according to the n2 underlying data acquired using the n2 normal sensing electrodes, wherein the n1 reference underlying data and the n2 underlying data are configured to form the fingerprint data.

10. The terminal of claim 9, wherein the matching unit is further configured to count the number of the at least one template feature point successfully matched with the reference feature point set, wherein the at least one template feature point in the pre-stored fingerprint template feature point set is successfully matched with the reference feature point set when the reference feature point set comprises at least one target feature point, and a matching degree between the at least one target feature point and the at least one template feature point is greater than a first preset threshold.

11. The terminal of claim 9, further comprising:

a second acquiring unit, configured to acquire N feature point sets of N fingerprint images that successfully unlocked the terminal for N times, wherein one fingerprint image corresponds to one feature point set, and N is an integer greater than 1;

a first determining unit, configured to determine, according to the N feature point sets and the pre-stored fingerprint template feature point set, a number of times of successful matching of each template feature point in the pre-stored fingerprint template feature point set; and a second determining unit, configured to determine matching priority of each template feature point, according to the number of times of successful matching of each template feature point.

12. The terminal of claim 9, wherein the first acquiring unit is further configured to:

generate a fingerprint image based on the fingerprint data; and extract feature points of the fingerprint image to form the reference feature point set.

13. The terminal of claim 9, wherein the first acquiring unit that is configured to determine the n1 reference underlying data is further configured to:

calculate a first average value of the n2 underlying data and determine the first average value as each of the n1 reference underlying data corresponding to the n1 abnormal sensing electrodes; or acquire a coordinate value of each of the n1 abnormal sensing electrodes and perform an averaging process on each abnormal sensing electrode according to a coordinate value of each abnormal sensing electrode and the n2 underlying data to obtain the n1 reference underlying data corresponding to the n1 abnormal sensing electrodes.

14. The terminal of claim 13, wherein the first acquiring unit that is configured to perform the averaging process is further configured to:

determine at least one sensing electrode from the n2 normal sensing electrodes, wherein a distance between each of the at least one sensing electrode and the abnormal sensing electrode that is currently undergoing the averaging process is less than a default distance; and calculate a second average value of at least one underlying data corresponding to the at least one sensing electrode, and determine the second average value as the reference underlying data of the abnormal sensing electrode that is currently undergoing the averaging process.

15. The terminal of claim 9, wherein the unlocking control unit is configured to:

load a system application desktop of the terminal; or load an application interface of an application being interrupted by a previous screen-off operation of the terminal; or unlock the terminal when the number of the at least one template feature point successfully matched with the reference feature point set is greater than a second preset threshold.

16. A method for controlling unlocking, comprising:

scanning a finger of a user using a fingerprint recognition sensor of a terminal to acquire fingerprint data;

acquiring N feature point sets of N fingerprint images that successfully unlocked the terminal for N times, wherein one fingerprint image corresponds to one feature point set, and N is an integer greater than 1;

matching each feature point in a fingerprint template feature point set with the N feature point sets;

determining a number of times of successful matching of each feature point in the fingerprint template feature point set according to the N feature point sets and the fingerprint template feature point set; and selecting template feature points sequentially from the fingerprint template feature point set according to the number of times of successful matching, and matching the selected template feature points with a reference feature point set acquired by scanning the finger of the user;

unlocking the terminal based on a number of template feature points successfully matched with the reference feature point set;

wherein scanning the finger of the user using the fingerprint recognition sensor to acquire fingerprint data comprises:

acquiring n2 underlying data using n2 normal sensing electrodes of the fingerprint recognition sensor, wherein the fingerprint recognition sensor comprises n1 abnormal sensing electrodes and the n2 normal sensing electrodes, n1 and n2 being positive integers; and determining n1 reference underlying data corresponding to the n1 abnormal sensing electrodes according to the n2 underlying data acquired using the n2 normal sensing electrodes, wherein the n1 reference underlying data and the n2 underlying data are configured to form the fingerprint data.

17. The method of claim 16, wherein unlocking the terminal comprises: unlocking the terminal when the number of template feature points successfully matched with the reference feature point set, satisfies a default condition.

18. The method of claim 17, wherein selecting template feature points sequentially from the fingerprint template feature point set according to the number of times of successful matching comprises:

selecting template feature points in a descending order of the number of times of successful matching.

* * * * *